US006824047B2

(12) United States Patent
Katou et al.

(10) Patent No.: US 6,824,047 B2

(45) Date of Patent: Nov. 30, 2004

(54) BILL HANDLING MACHINE

(75) Inventors: Riichi Katou, Nagoya (JP); Shinji Shibata, Nagoya (JP); Akira Nomiyama, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/235,946

(22) Filed: Sep. 6, 2002

(65) Prior Publication Data

US 2003/0121077 A1 Jun. 26, 2003

(30) Foreign Application Priority Data

Dec. 26, 2001 (JP) ....................................... 2001-393693

(51) Int. Cl.[7] ................................................ G06F 17/60

(52) U.S. Cl. ............................. 235/379; 902/8; 902/12; 235/379

(58) Field of Search ........................ 902/8–17; 235/375, 235/379, 381, 383; 209/534; 705/43

(56) References Cited

U.S. PATENT DOCUMENTS 4,163,157 A * 7/1979 Guignard et al. ...... 250/559.37
4,357,528 A * 11/1982 Smith et al. ................... 377/8
4,487,306 A * 12/1984 Nao et al. .................. 194/207
4,602,332 A 7/1986 Hirose et al.
5,076,441 A * 12/1991 Gerlier ....................... 209/534
5,135,212 A 8/1992 Utsumi et al.
5,174,562 A 12/1992 Mizunaga et al.
5,174,662 A * 12/1992 Harvey ....................... 384/611
5,407,191 A * 4/1995 Ukai .......................... 271/227
5,527,031 A * 6/1996 Walsh et al. ................ 271/259
5,555,983 A 9/1996 Yamagishi
6,000,555 A * 12/1999 Anma ........................ 209/534
6,039,164 A * 3/2000 Waters et al. ............... 194/206
6,042,110 A * 3/2000 Inage ......................... 271/251
6,234,294 B1 * 5/2001 Defeo et al. ................ 194/207
6,290,070 B1 * 9/2001 Graef et al. ................ 209/534
6,354,507 B1 * 3/2002 Maeda et al. ............... 235/494
6,357,598 B1 * 3/2002 Kimura et al. .............. 209/534
6,481,620 B1 * 11/2002 Katou et al. ................ 235/379
6,550,621 B2 * 4/2003 Fukatsu et al. ............. 209/534

FOREIGN PATENT DOCUMENTS

EP 0 734 001 A2 9/1996
EP 0 907 152 A2 4/1999
JP 07262435 A * 10/1995 ............ G07D/9/00

* cited by examiner

*Primary Examiner*—Karl D. Frech
*Assistant Examiner*—Daniel Walsh
(74) *Attorney, Agent, or Firm*—McDermott Will & Emery LLP

(57) ABSTRACT

The technique of the present invention effectively prevents banknotes from being stored in an inadequate state in a cabinet of a cash recycling-type bill handing machine. In the bill handling machine, it is determined whether or not the conveyance state of each banknote is within an allowable range Wst fit for storage in a recycle cabinet, and unfit banknotes are conveyed to a non-recycle cabinet. The determination is based on a deviation Ost of each banknote in conveying position. This arrangement desirably prevents storage of banknotes in the recycle cabinet in an inadequate state and stabilizes operations of the bill handling machine.

16 Claims, 8 Drawing Sheets

BILL HANDLING MACHINE

BACKGROUND OF THE INVENTION

The present invention relates to a cash-recycling-type bill handling machine for receiving and dispensing banknotes.

Automated teller machines (hereafter referred to as ATMs) are used for deposits and withdrawals from and to customers in diverse credit institutions. The ATM has a built-in bill handling machine for receiving, storing, and dispensing banknotes. The banknote handling machine sends banknotes from an inner cabinet to a money slot in response to an instruction from the upper-level ATM. One typical example of the bill handing machine is a cash recycling type that allows received banknotes to be recycled for subsequent dispensing.

SUMMARY OF THE INVENTION

Series of banknotes handled by the bill handing machine may have significantly varying sizes. For example, the size of euro banknotes significantly varies in a range of 62 to 82 mm in length and in a range of 120 to 160 mm in width, while the length of Japanese banknotes is fixed to 76 mm and the width varies only in a range of 150 to 160 mm.

With a view to reduction of manufacturing cost and flexible operations of the bill handling machine, it is preferable that a cabinet in the bill handing machine is applicable commonly for various series of banknotes. The cabinet is thus designed according to the maximum size of banknotes handled. Such design may cause an inadequate storage state of smaller-sized banknotes, for example, a jog state. The inadequate storage state may result in malfunction in the course of conveying and storing banknotes.

This problem is frequently observed when the size of the cabinet is excessively marginal to the size of banknotes stored therein, although not restrictive. Even when the size of the cabinet is suitable for the size of banknotes, the conveyance state may cause inadequate storage.

The object of the present invention is thus to solve the problems discussed above and to provide a technique of preventing banknotes from being stored in an inadequate state in a cabinet of a cash recycling-type bill handling machine.

In order to attain at least part of the above and the other related objects, the technique of the present invention determines whether or not a conveyance state of each banknote is adequate for storage in a recycle cabinet, and conveys unfit banknotes to a non-recycle cabinet. The recycle cabinet stores fit banknotes recyclable for subsequent dispensing, among received banknotes. The non-recycle cabinet stores unfit banknotes for subsequent dispensing, among the receiving banknotes. This arrangement desirably prevents storage of banknotes in the recycle cabinet in an inadequate state and stabilizes operations of the bill handling machine.

In the technique of the present invention, the non-recycle cabinet may be identical with or separate from a reject cabinet that stores counterfeits and badly damaged banknotes. In the case of using the separate reject cabinet and non-recycle cabinet, the non-recycle cabinet stores recyclable banknotes if the conveyance state to the cabinet is adequate for storage. The advantage of this application is effective use of such banknotes without re-identification.

The determination of the conveyance state is carried out, for example, based on a deviation or an inclination of banknotes in a conveyance module. The deviation may represent an offset or a difference between the center point of a bank note in the optimum conveyance state and the center point of a bank note actually conveyed. The inclination may represent a skew angle or an angle of the symmetrical axis of a banknote to a conveying direction.

One preferable procedure sets a reference value used for determination of adequacy of the conveyance state, and compares the observed deviation or inclination with the predetermined reference value. The reference value may be fixed but is preferably changed over according to the width of the banknotes. The effect of the deviation or the inclination on the storage state of the banknote typically depends upon the width of the banknote. This arrangement thus ensures accurate determination of adequacy of the conveyance state. Namely the arrangement prevents the banknotes in the inadequate conveyance state from being mistakenly determined to be in the adequate conveyance state, while preventing the banknotes in the adequate conveyance state from being mistakenly determined to be in the inadequate conveyance state and unnecessarily increasing the number of banknotes conveyed to the non-recycle cabinet.

Although the technique of the invention may handle only one banknote series, the technique is effectively applied to handle a plurality of different banknote series. In the structure of changing over the reference value according to the width of the banknote, the reference value is preset according to the banknote series handled in the former case. In the latter case, on the other hand, the reference value should be changed over dynamically according to the banknote series. One preferable application for readily changing over the reference value stores in advance a mapping of the banknote series to the reference value and identifies the series of the received banknotes.

A diversity of techniques may be applied to set the reference value described above or another criterion for determination of adequacy of the conveyance state. For example, the bill handling machine may be provided with a setup panel for such setting. The bill handling machine having the function of communicating with an upper-level device or an external device may carry out the setting through communication. One embodiment causes information regarding the banknote series to be stored and the criterion to be recorded in the recycle cabinet and reads this information from the recycle cabinet included in the bill handling machine. In the setting of the reference value, it is preferable to preset a recommended value corresponding to each banknote series. In practice, it is further preferable that the recommended value can be varied in the course of operations of the bill handling machine.

In the technique of the present invention, the conveyance state of each banknote may be detected, based on imaging of the banknote. A digital camera, a scanner, or any other suitable device may be utilized for imaging. The imaging may be carried out independently for identification of the banknote type. Another detection method uses a sensor that is disposed to detect the pass position of each banknote in a direction crossing over the conveying direction in the conveyance module. The sensor may be an optical sensor, an acoustic sensor like a ultrasonic sensor, or a mechanical sensor utilizing, for example, a micro-switch.

The conveyance operation in the bill handing machine includes a cash counting operation that conveys the received banknotes to the temporary storage unit and a cash storage operation that conveys banknotes from the temporary storage unit to the recycle cabinet or the non-recycle cabinet. It is preferable to adopt a stricter criterion in the cash storage operation than that in the cash counting operation with regard to the determination of the conveyance state adequate for storage of the recycle cabinet. The strict criterion is not adopted for both the cash counting operation and the cash storage operation. Adequacy of the conveyance state may not be determined in the process of the cash counting operation. This application effectively prevents an unnecessary increase in number of banknotes conveyed to the non-recycle cabinet.

The technique of the present invention is especially effective when an allowable banknote storage width in the recycle cabinet is significantly larger than a width of banknotes to be stored in the recycle cabinet, since the inadequate storage state often occurs in such cases. The term 'significantly larger' means that there is an excess margin, which may cause a jog of banknotes, over an allowable range, which depends upon a banknote receiving and dispensing mechanism into and from the recycle cabinet for adequate receiving and dispensing of banknotes.

The technique of the present invention is not restricted to the bill handling machine, but may be actualized by a diversity of other applications, for example, a conveyance control method that controls a storage location of banknotes in a cash recycling-type bill handling machine. Other applications also include a computer program that causes the computer to attain such control and a recording medium in which the computer program is recorded. Typical examples of the recording medium include flexible disks, CD-ROMs, DVDs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

DESCRIPTION OF THE EMBODIMENTS

One mode of carrying out the invention is discussed below as one embodiment.

A. General Construction

Figure 1:
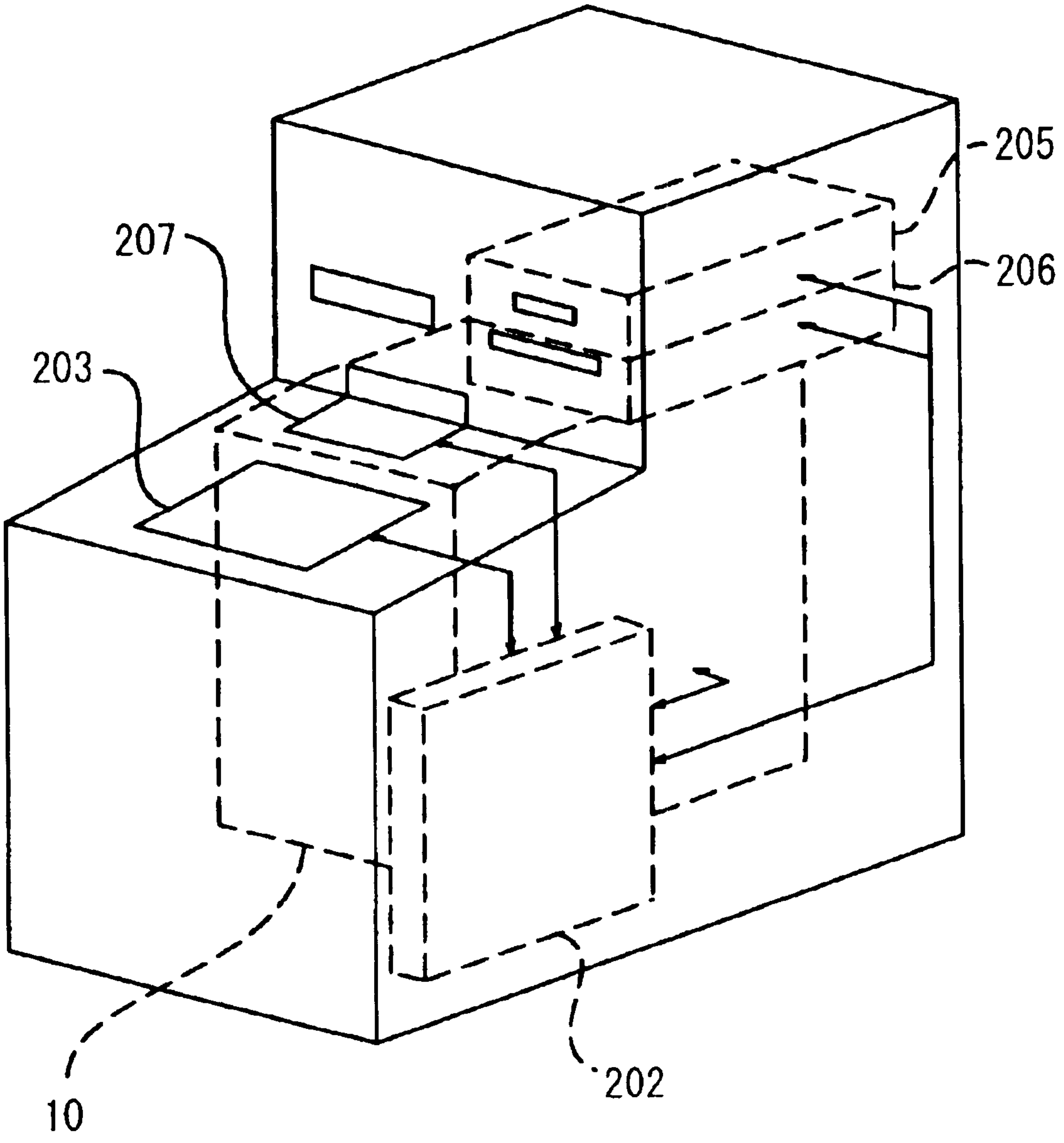
FIG. 1 schematically illustrates the construction of an automated teller machine (ATM)

FIG. 1 schematically illustrates the construction of an automated teller machine (hereafter referred to as ATM) in one embodiment of the present invention. The ATM is installed in, for example, banks and other credit institutions for deposits and withdrawals according to customers' operations.

The ATM of the embodiment has a plurality of units in the illustrated arrangement. A card reading mechanism 205 functions to read information recorded in a magnetic strip card, such as a cash card. The information recorded in the card includes, for example, a bank account number and a personal identification number of each card holder or customer.

An operation unit 203 is an interface that displays information required for deposit and withdrawal transactions and is operated for a deposit or a withdrawal. A touch panel is applied for the operation unit 203 in this embodiment, although the operation unit 203 may be a combination of a display with push button switches. In the structure of this embodiment, the operation unit 203 also functions as an interface to set a reference value for determining adequacy of the conveyance state of each banknote in the bill handling machine 10, as discussed later.

The ATM receives and dispenses banknotes from and to the customer via a bill receiving and dispensing slot 207. At the time of receiving cash, a built-in bill handling machine 10 checks the banknotes placed in the bill receiving and dispensing slot 207 by the customer and classifies the banknotes into respective banknote series for storage. At the time of dispensing cash, the bill handling machine 10 provides banknotes corresponding to the customer's desired amount of money and transfers the banknotes to the customer via the bill receiving and dispensing slot 207. A transaction record issuing mechanism 206 issues a transaction record of the deposit or the withdrawal.

The ATM is not restricted to the above construction but may include a diversity of other units and mechanisms. For example, the ATM may have a passbook processing unit and a coin handling mechanism, in addition to the constituents described above.

The operations of the respective constituents included in the ATM are controlled by a control unit 202. The control unit 202 is constructed as a microcomputer including a CPU and memories. The control unit 202 receives and transmits information from and to the respective constituents to control the whole operations of the ATM.

B. Bill Handling Machine

Figure 2:
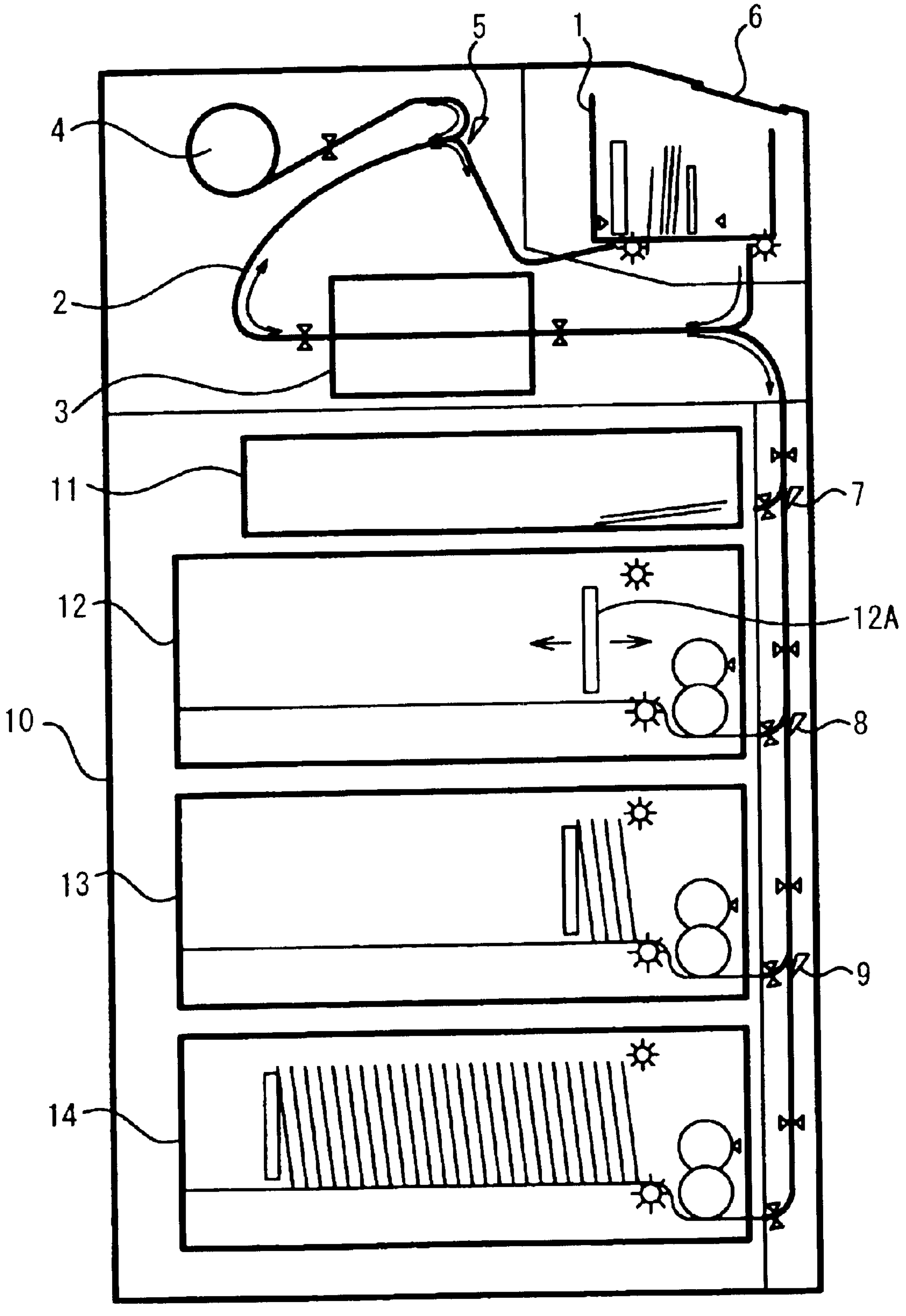
FIG. 2 is a side sectional view schematically illustrating the structure of a bill handling machine 10.

FIG. 2 is a side sectional view schematically illustrating the structure of the bill handling machine 10 built in the ATM. A banknote receiving and dispensing module 1 is a space for receiving and dispensing banknotes from and to the customer. The inlet of the banknote receiving and dispensing module 1 has a shutter 6, which cooperates with the bill receiving and dispensing slot 207 of the ATM to automatically open and close.

The bill handling machine 10 has recycle cabinets 12 through 14 for storage of normal banknotes usable for recycle (hereafter referred to as 'genuine banknotes'), a non-recycle cabinet 11 for storage of genuine banknotes determined to be in some inadequate conveyance state, for example, banknotes deviated from the normal conveyance position, and a temporary storage cabinet 4 for temporary storage of banknotes in the course of conveyance in the bill handling machine 10. The bill handling machine 10 also includes a reject box for storage of abnormal banknotes (hereafter referred to as 'rejected banknotes'). The reject box is omitted from the illustration of FIG. 2 for simplicity of illustration. Although the reject box is separate from the non-recycle cabinet 11 in the structure of this embodiment, one cabinet may be shared for both the purposes.

The banknote series stored in each recycle cabinet is set in advance. Euro banknotes are stored in the cabinets in this embodiment, although this is not restrictive. The recycle cabinet 12 has a movable push plate 12A not to make a confusion in arrangement order of banknotes but to keep the banknotes in an orderly manner. The other recycle cabinets 13 and 14 have a similar push plate.

A conveyance module 2 functions to convey banknotes between the banknote receiving and dispensing module 1 and each cabinet. Gates for switching over the destination of conveyance of each banknote are provided on the pathway of the conveyance module 2. A gate 5 is in charge of switchover between the temporary storage unit 4 and the banknote receiving and dispensing module 1. A gate 7 switches over the destination of conveyance to the non-recycle cabinet 11. Gates 8 and 9 switch over the destination of conveyance to the respective recycle cabinets 12 through 14.

There is an identification module 3 on the pathway of the conveyance module 2. The identification module 3 utilizes an optical sensor or any other suitable sensor to identify each banknote passing through the sensor and outputs a result of the identification. An image of the banknote taken by a scanner may be used for the identification. The result of the identification includes, for example, the banknote series and the size of the banknote. The banknotes identified as counterfeits and the badly damaged banknotes identified as unfit banknotes by the identification module 3 are handled as the rejected banknotes.

The bill handling machine 10 includes a control unit, although not being specifically illustrated. The control unit is constructed as a microcomputer including a CPU and memories and controls the operations of the bill handling machine 10 according to preset programs.

C. Control Blocks

Figure 3:
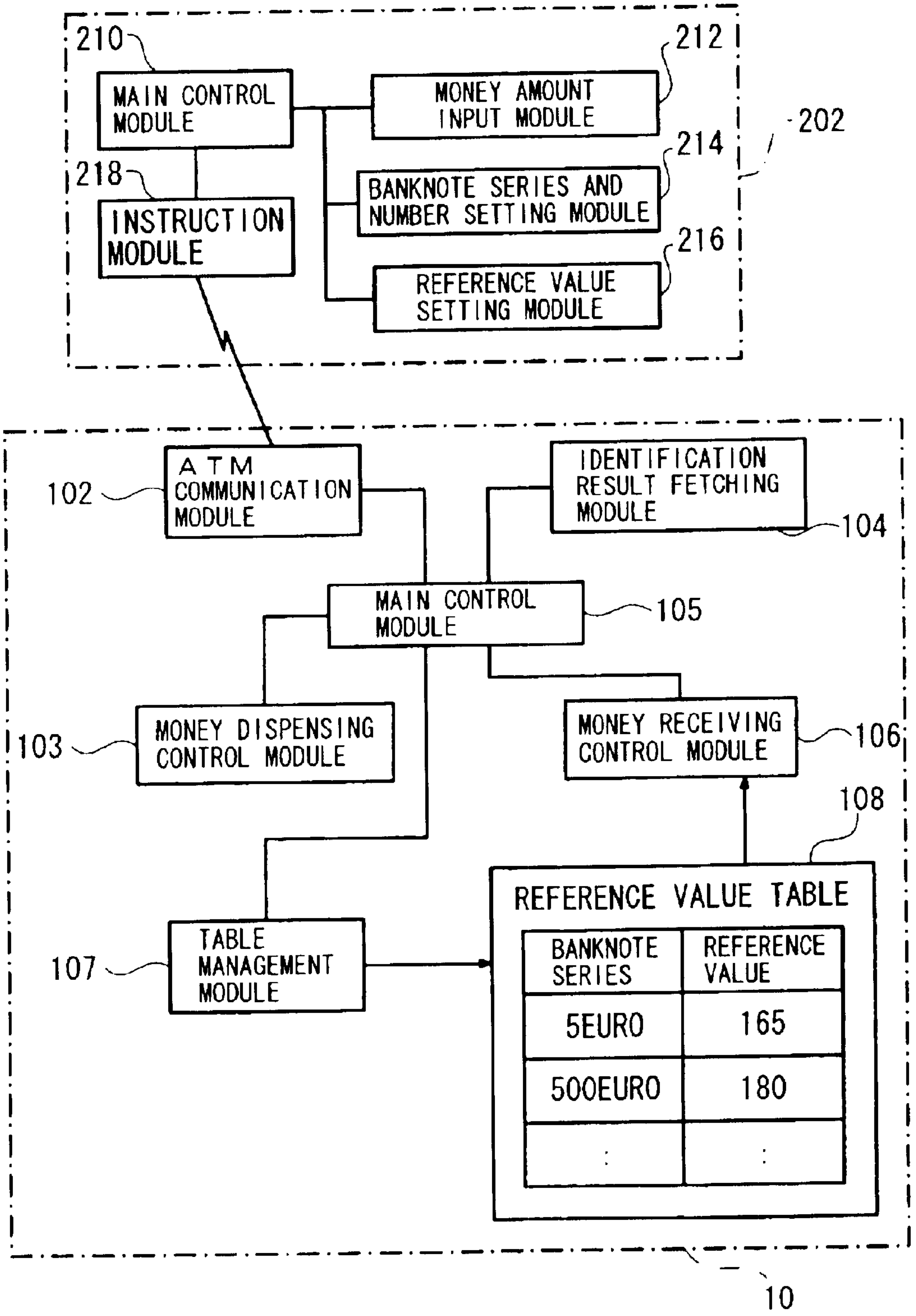
FIG. 3 shows control blocks of the ATM and the bill handling machine 10.

FIG. 3 shows control blocks of the ATM and the bill handling machine 10. The respective illustrated functional groups are constructed by software in the control unit 202 of the ATM and the control unit of the bill handling machine 10. These functional blocks may alternatively be constructed by hardware.

The functional blocks in the ATM exert the corresponding functions under control of a main control module 210. A money amount input module 212 controls the operation unit 203 to receive a customer's input of a desired amount of money to be withdrawn. A banknote series and number setting module 214 sets the number of banknotes to be dispensed with regard to each banknote series, based on the input amount of money. The settings of the banknote series and their numbers are transmitted as a dispensing instruction via an instruction module 218 to the bill handling machine 10.

The bill handling machine 10 of the embodiment determines adequacy of the conveyance state of each banknote and changes over the storage location of the banknotes, as described later. A reference value setting module 216 included in the ATM is an interface used when an operator of the ATM sets a reference value as a criterion for determining adequacy of the conveyance state. The interface may be displayed on the operation unit 203 or alternatively on an exclusive setting panel provided, for example, on the rear face of the ATM.

The functional blocks in the bill handling machine 10 exert the corresponding functions under control of a main control module 105.

An ATM communication module 102 transmits information to and from the instruction module 218 of the ATM. For example, the ATM communication module 102 transmits an instruction input through an operation of the operation unit 203 to the main control module 105, while transmitting results of the processing executed by the bill handling machine 10 to the control unit 202. A money dispensing control module 103 conveys banknotes in response to the dispensing instruction transmitted from the ATM as discussed above.

An identification result fetching module 104 fetches a result of identification by the identification module 3, as well as an image of each banknote taken in the course of identification. A money receiving control module 106 controls conveyance of received banknotes according to the following procedure. In the money receiving process, the banknotes placed in the banknote receiving and dispensing module 1 are passed through the identification module 3 and are transferred to the temporary storage unit 4. The identification module 3 identifies each banknote and counts the total amount of the received money. When the customer confirms the amount of depositing money, the banknotes kept in the temporary storage unit 4 are again passed through the identification module 3 and are stored in the respective recycle cabinets according to the banknote series. Unfit banknotes in an inadequate conveyance state are conveyed to the non-recycle cabinet 11, while the rejected banknotes are conveyed to the reject cabinet.

The control according to the conveyance state is carried out based on the image of the banknote obtained from the identification module 3 and a reference value table 108. The money receiving control module 106 gains a decision parameter for determining adequacy of the conveyance state of each banknote from this image, and determines adequacy of the conveyance state based on a result of comparison between the value of the decision parameter and the reference value set in the reference value table 108. The decision parameter used in this embodiment is a deviation of the banknote position in the conveyance module 2. The decision parameter will be discussed in detail later.

A mapping of each banknote series to the reference value used for determination of adequacy of the conveyance state is stored in the reference value table 108. The mapping is managed by a table management module 107. The table management module 107 functions to update the setting in the reference value table 108, in response to an instruction from the reference value setting module 216 included in the control unit 202 of the ATM. For example, the reference value setting module 216 displays an interface for setting the reference value in the illustrated form of the reference value table 108 on the operation unit 203. The operator utilizes this interface to input the banknote series and the reference value.

In another preferable application, recommended values mapped to the respective banknote series are set in advance in the bill handling machine 10. The recommended value is set in the reference value table 108, in response to the operator's input of the banknote series to be handled. This arrangement desirably saves the time and labor for setting the reference value. In still another preferable application, the operator sets any arbitrary value for the reference value. This arrangement advantageously ensures flexible setting of the optimum value for the reference value.

A diversity of methods other than the operator's setting via the operation unit, may be applied to set the reference value. For example, when either the bill handling machine 10 or the ATM is externally communicable, the reference value may be setting remotely through communication. This arrangement enables simultaneous settings in multiple bill handling machines or ATMs, thus further reducing the time and labor for setting the reference value. In another example, information regarding the banknote series and the reference value is recorded in the form of IC chips or dip switches in the recycle cabinets 12 through 14. The bill handling machine 10 reads the recorded information and sets the reference value according to the information. This arrangement desirably prevents the mismatch of the banknote series to be handled and the reference value.

D. Decision Parameter of Conveyance State

Figure 4:
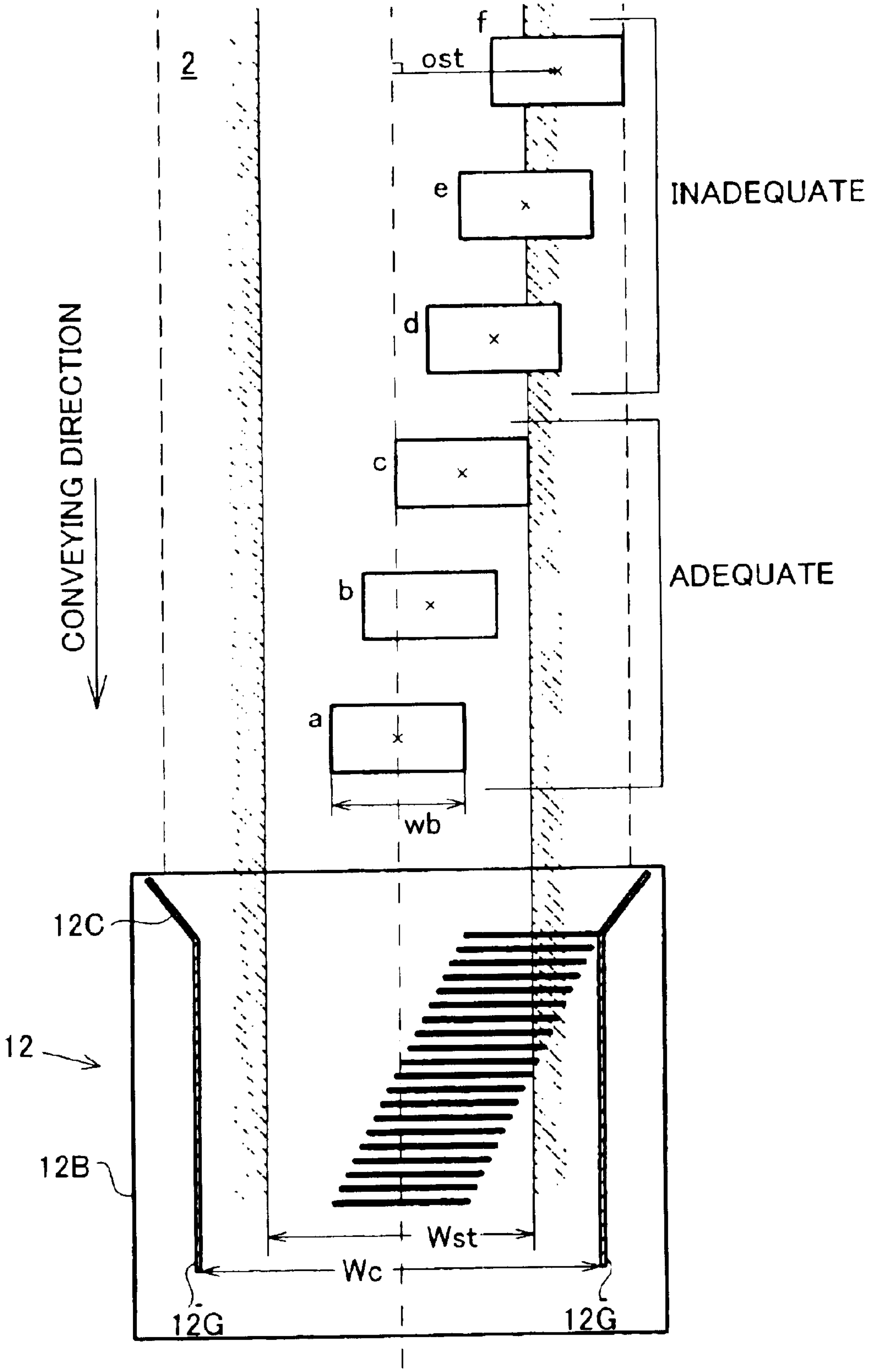
FIG. 4 shows a decision parameter of the conveyance state.

FIG. 4 shows the decision parameter of the conveyance state. In this example, the states of banknotes conveyed in the conveyance module 2 to the recycle cabinet 12 are schematically illustrated. The lower portion of FIG. 4 gives a perspective plan view of the recycle cabinet 12. The recycle cabinet 12 has a guide 12G for keeping banknotes in an orderly manner in a casing 12B. The guide 12G has a width Wc. The guide 12G is expanded at the inlet of the recycle cabinet 12 to form a lead-in element 12C. The guide 12G may have a variable width according to the size of the banknote series handled.

Two broken lines in the drawing represent the conveyance module 2. As clearly shown in FIG. 2, the conveyance module 2 is actually oriented in a direction perpendicular to the sheet surface of FIG. 4. For convenience of explanation, however, the conveyance module 2 is extended on the sheet surface in the illustration.

Banknotes a through f having difference conveyance states are shown in the drawing. The conveyance positions of the banknotes a through f are gradually deviated from the centerline of the conveyance module 2 rightward in the drawing. Such deviations of the conveyance position of banknotes cause the banknotes to be kept in a non-orderly manner with positional deviations from the center in the recycle cabinet 12. The non-orderly arrangement of banknotes may cause malfunctions in the process of storing and dispensing banknotes. The recycle cabinet 12 accordingly has an allowable banknote storage width Wst to attain the adequate storing and dispensing operations. The banknotes conveyed with a positional deviation from the centerline over this allowable banknote storage width Wst, that is, the banknotes protruding to a hatched area, are in the inadequate conveyance state. It is preferable that such banknotes are not received by the recycle cabinet 12. In the illustrated example, the banknotes a through c are in the adequate conveyance state, whereas the banknotes d through f are in the inadequate conveyance state.

In this embodiment, the allowable banknote storage width Wst is used as the reference value for determining adequacy of the conveyance state. This allowable banknote storage width Wst is varied according to the width Wc of the guide 12G, a width wb of the banknote, and a receiving and dispensing mechanism of the recycle cabinet 12. In the arrangement of this embodiment, the reference value is set according to the banknote series (see the reference value table 108 in FIG. 3).

An identical reference value may be commonly applied for all the banknote series. In this embodiment, the reference value is set equal to 165 mm with regard to 5 euro banknotes of 120 mm in width and equal to 180 mm with regard to 500 euro banknotes of 160 mm in width. An identical reference value of 165 mm may be set commonly. In the latter case, selective use of the reference value according to the banknote series is not required, so that the decision process is advantageously simplified. Note that, however, the allowable deviation is only 5 mm since the width of the 500 euro banknote is 160 mm. It is accordingly possible that the rate of banknotes determined to be in the inadequate conveyance state unnecessarily increases. Setting the reference value according to the banknote series advantageously reduces the rate of banknotes determined to be in the inadequate conveyance state and ensures the adequate storage of banknotes, in the case where multiple banknote series having significantly different sizes are to be handled In this embodiment, the allowable banknote storage width is applied for the reference value. A diversity of other parameters representing the positional deviation of the banknote may also be utilized, for example, an offset Ost between the center point of the banknote and the centerline of the conveyance module 2.

E. Conveyance Control Process

Figure 5:
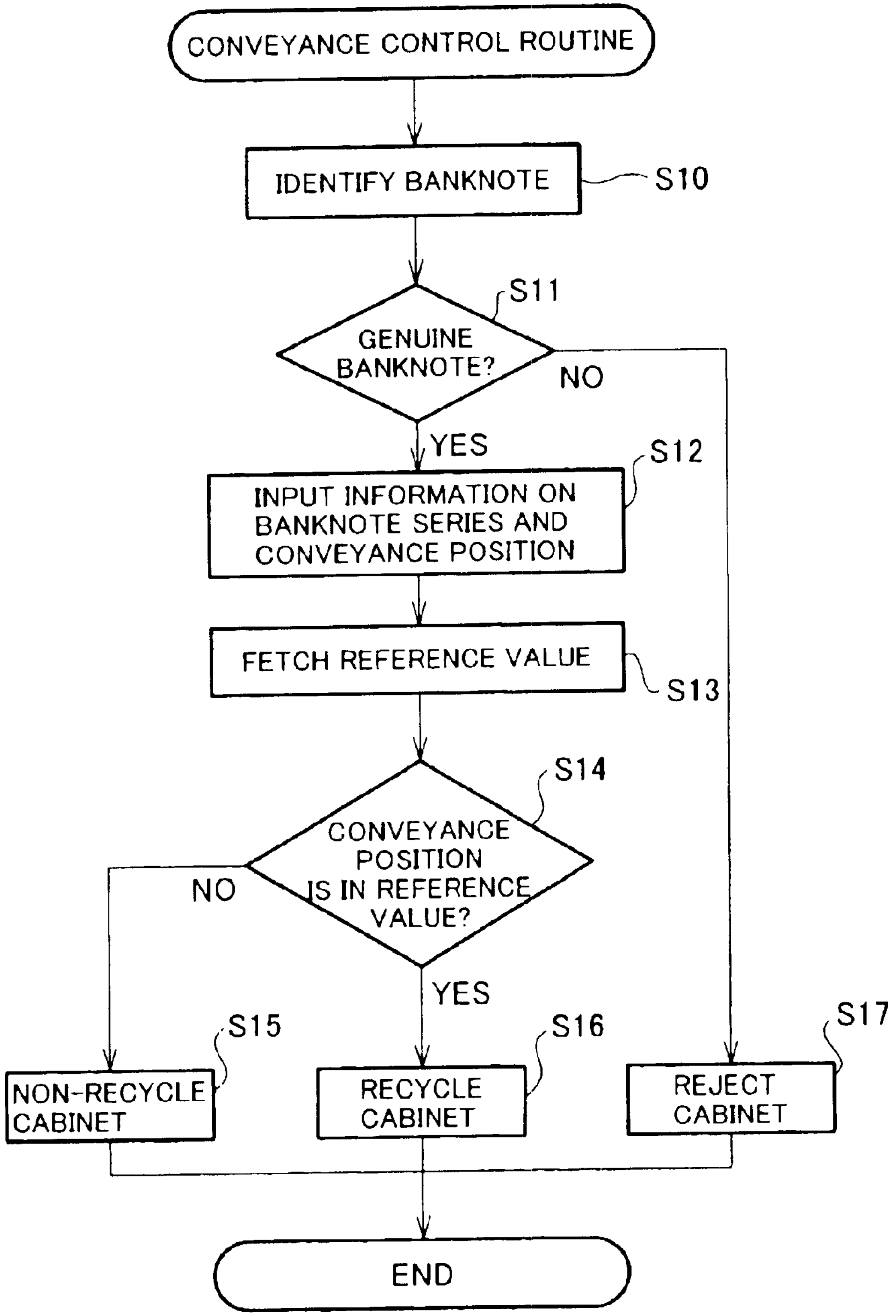
FIG. 5 is a flowchart showing a conveyance control routine.

FIG. 5 is a flowchart showing a conveyance control routine. The control unit of the bill handling machine 10 executes this routine at the time of conveyance of banknotes from the temporary storage unit 4 to the respective cabinets, that is, in a cash storage operation. This routine is carried out in response to a customer's depositing instruction, subsequent to a cash counting operation that conveys banknotes from the banknote receiving and dispensing module 1 to the temporary storage unit 4 and counting the total amount of received money.

The control unit identifies each banknote conveyed from the temporary storage unit 4 (step S10). The banknote identified as the non-genuine or the rejected banknote (step S11) is conveyed to the reject cabinet (step S17). The banknote series and the genuineness of the banknote have already been identified in the cash counting operation. The identification module 3 may accordingly fetch only the information with regard to the conveyance position at step S10. In this case, the result of the identification in the cash counting operation is utilized as the information regarding the banknote series and the genuineness of the banknote.

In the case of identification as a genuine banknote (step S11), the control unit fetches the information with regard to the banknotes series and the conveyance position from the identification module 3 (step S12). The information with regard to the conveyance position is a value corresponding to the offset Ost shown in FIG. 4. Another procedure of step S12 may fetch the image of the banknote from the identification module 3 and compute the offset Ost.

The control unit subsequently refers to the reference value table 108 and reads out the reference value corresponding to the banknote series (step S13) and determines whether or not the conveyance position is in the reference value (step S14). The determination may be based on the following comparison between the reference value Wst and the offset Ost:

$Ost > Wst/2 \rightarrow$ The conveyance position is out of the reference value (inadequate conveyance state); and $Ost \leqq Wst/2 \rightarrow$ The conveyance position is in the reference value (adequate conveyance state).

When it is determined that the conveyance position is in the reference value, that is, in the case of the adequate conveyance state (step S14), the banknote is conveyed to one of the recycle cabinets 12 through 14 corresponding to the banknote series (step S16). When it is determined that the conveyance position is out of the reference value, that is, in the case of the inadequate conveyance state (step S14), the banknote is conveyed to the non-recycle cabinet 11 (step S15). The above series of processing is repeatedly carried out for all the banknotes kept in the temporary storage unit 4.

As described above, the bill handling machine of the embodiment determines adequacy of the conveyance state of each banknote and controls the storage location of the banknote. This arrangement enables banknotes to be stored in an adequate state in recycle cabinets and ensures stable banknote receiving and dispensing operations.

The above description regards only the processing in the cash storage operation. The determination of adequacy of the conveyance state may be carried out only in the cash storage operation or in both of the cash counting operation and the cash storage operation. In the case where the adequacy of the conveyance state is determined in both of the cash counting operation and the cash storage operation, it is preferable that the reference value adopted in the cash counting operation is greater than the reference value adopted in the cash storage operation. Namely the less strict criterion set for the determination of adequacy of the conveyance state in the cash counting operation is preferable. For example, the maximum reference value shown in FIG. 3 regardless of the banknote series may be adopted in the cash counting operation. The strict criterion is then not adopted in both of the cash counting operation and the cash storage operation. This arrangement desirably prevents an unnecessary increase in number of banknotes conveyed to the non-recycle cabinet 11. Omission of the determination of adequacy of the conveyance state in the cash counting operation has a similar advantage.

F. Modified Example (1)

Figure 6:
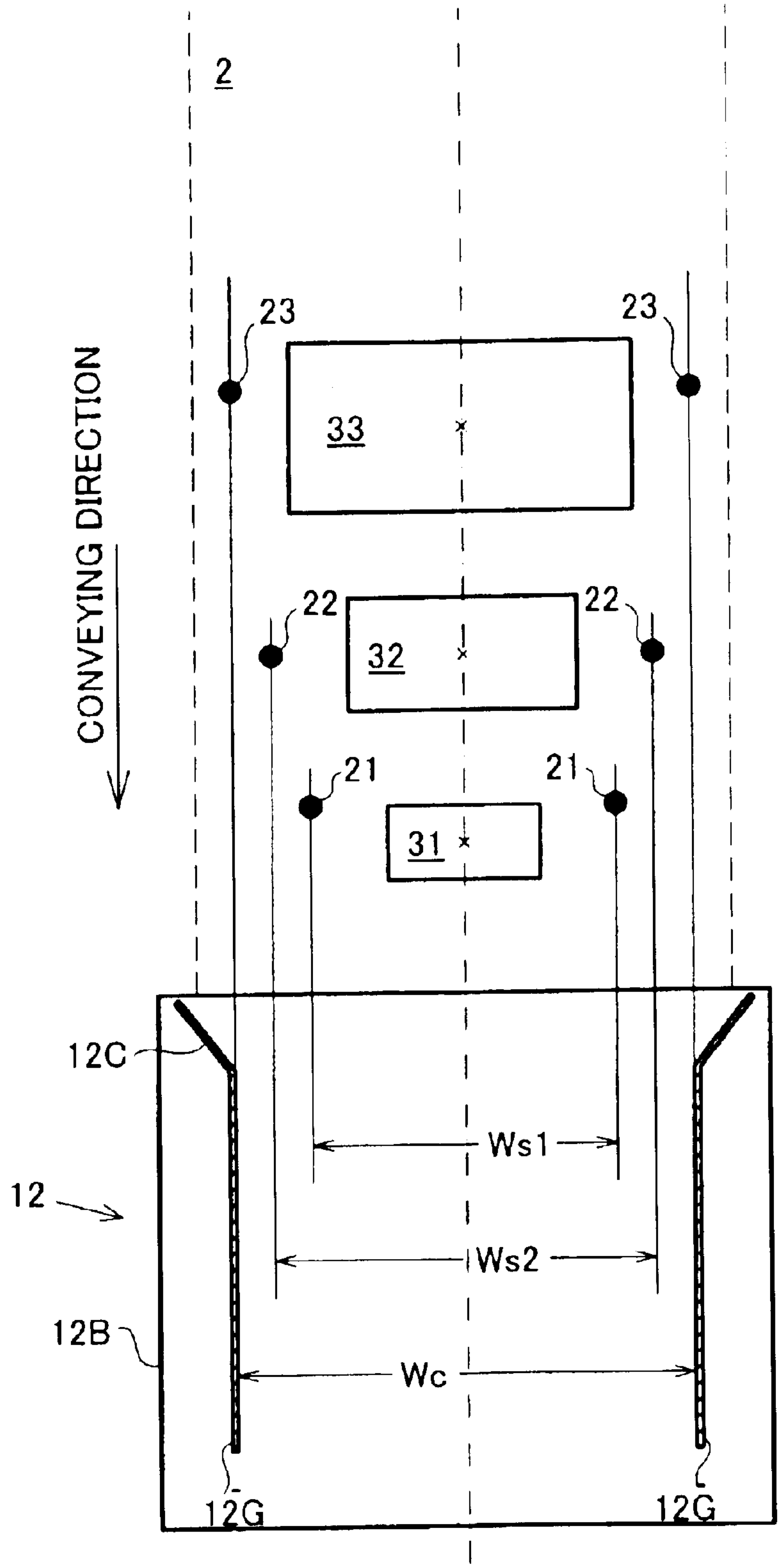
FIG. 6 shows a method of detecting the conveyance position in one modified example.

FIG. 6 shows a method of detecting the conveyance position in one modified example. The procedure of the above embodiment analyzes the offset Ost based on the image taken by the identification module 3. The conveyance position may be detected by point sensors provided in the conveyance module 2 as shown in FIG. 6.

In the bill handling machine of the modified example, the conveyance module 2 is provided with sensors 21 through 23 for detecting the position of each banknote passing therethrough. The sensor 21 is disposed at a position corresponding to a reference value Ws1 of a banknote 31. The sensor 22 and the sensor 23 are disposed respectively at a position corresponding to a reference value Ws2 of a banknote 32 and at a position corresponding to a reference value Wc of a banknote 33. Any sensors that can detect passage of banknotes are applicable for the sensors 21 through 23, for example, optical sensors and mechanical sensors utilizing micro switches.

In one example, it is assumed that the banknote 31 is conveyed on the conveyance module 2. In the course of conveyance, in the case where the sensor 21 does not detect passage of any banknote, it is determined that the banknote 31 passes through an inner area defined by the reference value Ws1. In the case where the sensor 21 detects passage of a banknote, on the other hand, it is determined that part of the banknote 31 passes through an outer area out of the reference value Ws1. The storage position of the banknote 31 is accordingly changed over between the recycle cabinet and the non-recycle cabinet, based on the detection result of the sensor 31. The other banknotes 32 and 33 are processed in a similar manner.

G. Modified Example (2)

Figure 7:
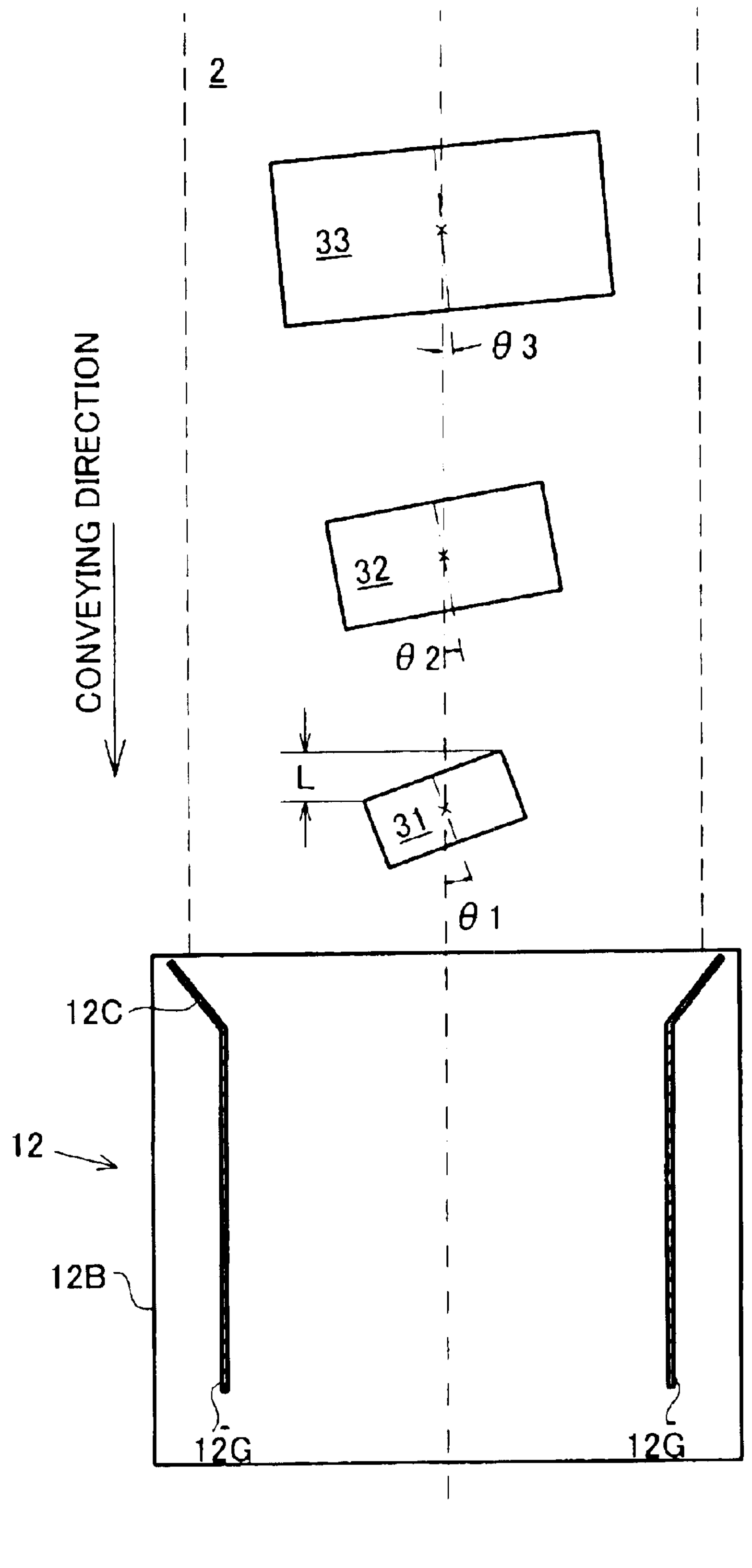
FIG. 7 shows another decision parameter of the conveyance state in another modified example.

FIG. 7 shows another decision parameter of the conveyance state in another modified example. The procedure of the above embodiment applies the offset Ost for the decision parameter of the conveyance state. A diversity of parameters other than the offset are applicable for determination of adequacy of the conveyance state.

In this modified example, an inclination of each banknote is used as the decision parameter. The inclination represents, for example, an angle θ1 of the conveying direction and a symmetrical axis of the banknote (hereafter this angle is referred to as the skew angle) as illustrated. The large skew angle may cause the banknote to be undesirably folded in the process of storage into the recycle cabinet. The procedure of this modified example sets the skew angle to attain the adequate storage as a reference value in the reference value table 108, and determines adequacy of the conveyance state based on the result of comparison between the observed skew angle in the actual conveyance process and the reference value.

The probability of folding a banknote depends upon a deviation L of one end position of the banknote from the other end position in the course of conveyance. It is accordingly preferable that the skew angle as the reference value is set according to the width of the banknote or the banknote series. The three banknotes 31 through 33 having different widths are shown in the illustrated example. The banknote having the larger width causes the greater deviation even with a small skew angle. The skew angle as the reference value thus decreases in the order of θ1 to θ3 according to the width of the banknote.

In this modified example, the deviation, instead of the skew angle, may be applied for the reference value.

The skew angle may be detected by analyzing the image taken by the identification module 3 in the same manner as discussed in the embodiment, or may be otherwise detected by means of point sensors.

Figure 8:
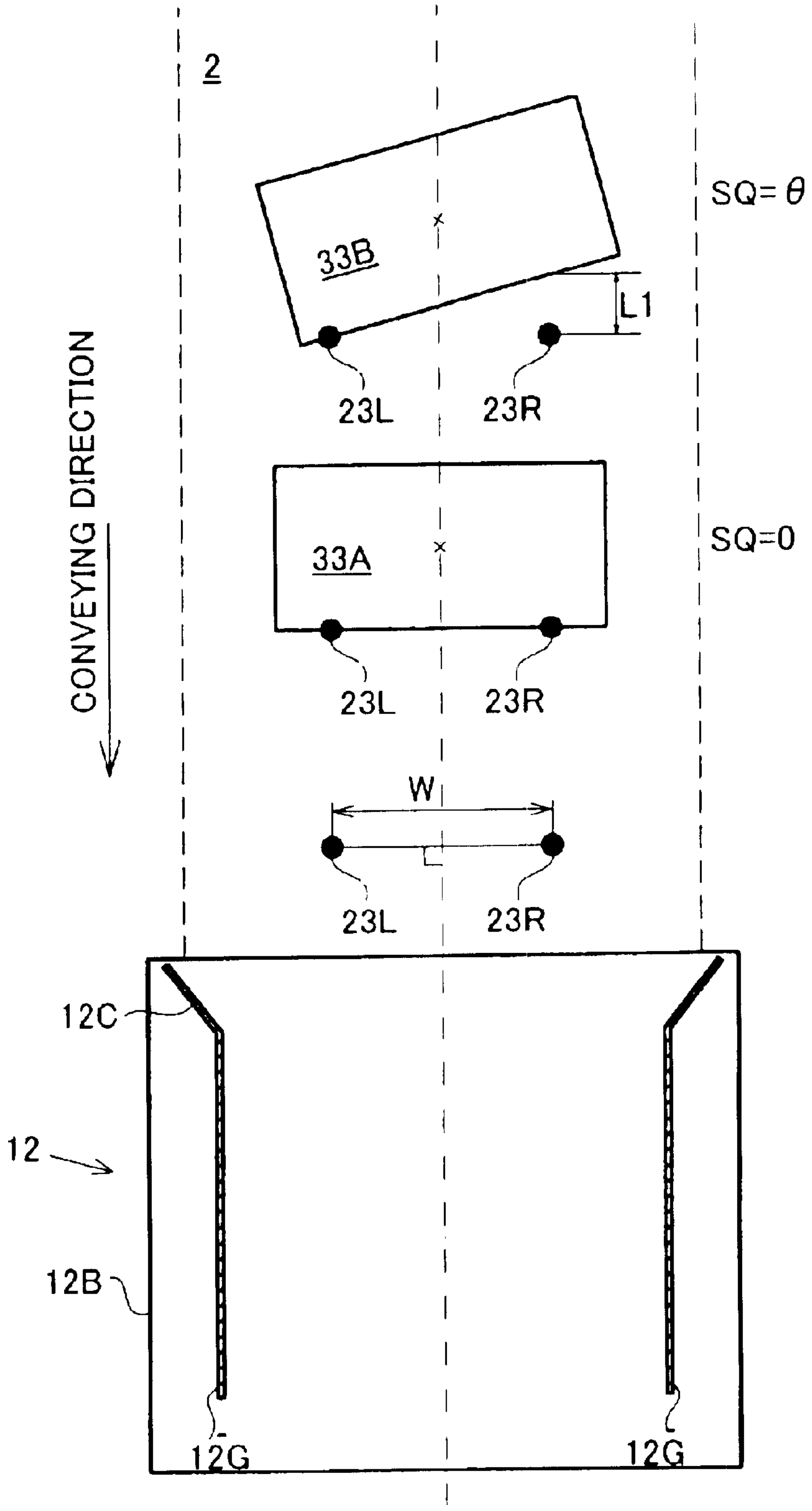
FIG. 8 shows a method of detecting the skew angle in the modified example.

FIG. 8 shows a method of detecting the skew angle in the modified example. In this modified example, two sensors 23L and 23R provided in the conveyance module 2 are used to detect the skew angle. The sensors 23L and 23R are arranged symmetrically about the centerline of the conveyance module 2 across an interval W.

A banknote 33A shown in the center portion of FIG. 8 has a skew angle SQ of 0. The two sensors 23L and 23R simultaneously detect passage of the banknote 33A. A banknote 33B shown in the upper portion of FIG. 8 has a skew angle SQ of θ. There is a time difference between these two sensors 23L and 23R in detection of passage of the banknote 33A. In this illustrated example, detection of passage of the banknote 33A by the sensor 23R is later than detection by the sensor 23L. This time delay depends upon a distance L1 between the sensor 23R and the banknote 33B at the time when the banknote 33 reaches the sensor 23L. The distance L1 is calculated as the product of the time delay to detection by the sensor 23R and the conveyance speed in the conveyance module 2. The skew angle is calculated according to an equation of $\tan \theta = L1/W$.

H. Other Modifications (1) The procedure of the above embodiment uses one of the decision parameters representing the deviation and the inclination to determine adequacy of the conveyance state. The adequacy of the conveyance state may be determined by means of a combination of these two decision parameters. In this case, for example, the reference value of the inclination may be varied according to the size of the banknote as well as the deviation. The decision parameter is not restricted to the deviation or the inclination, but any other parameters may be used alone or in an arbitrary combination.

(2) The above embodiment regards handling of euro banknotes including multiple banknote series having significantly different sizes. The technique of the present invention is, however, not restricted to such banknotes but is applicable to banknotes of a substantially fixed size, for example, Japanese banknotes. Such banknotes may also fall in an inadequate conveyance state for storage into the recycle cabinet.

(3) The bill handling machine of the embodiment handles a plurality of different banknotes. The bill handling machine may, however, handle only one type of banknote or even marketable securities of a fixed size.

(4) In the above embodiment, the size of each cabinet is sufficiently larger than the size of any banknote. The technique of the present invention is, however, not restricted to this embodiment, but is applicable to a cabinet having an equivalent size to that of a banknote.

(5) The procedure of the embodiment stores the mapping of the banknote series to the reference value in the form of a table (see FIG. 3). One modified application stores the reference value as a function of the banknote series or the width of the banknote and computes the reference value at the time of determination of adequacy of the conveyance state.

The above embodiment and its modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. For example, the various control processes discussed above may be actualized by a hardware construction, instead of the software configuration.

The bill handling machine of the present invention determines adequacy of the conveyance state of each banknote for storage into the recycle cabinet. This arrangement desirably prevents storage of banknotes in the recycle cabinet in an inadequate state and stabilizes operations of the bill handling machine.

What is claimed is:

1. A bill handling machine for receiving and dispensing banknotes, said bill handing machine comprising:

a recycle cabinet that stores fit banknotes recyclable for subsequent dispensing;

a non-recycle cabinet that stores banknotes unfit for subsequent dispensing a conveyance module that conveys banknotes to either one of said recycle cabinet and said non-recycle cabinet;

a conveyance state decision module that determines whether or not conveyance state of each banknote is adequate for storage in said recycle cabinet; and a conveyance control module, responsive to the conveyance state of a respective banknote being inadequate for storage in said recycle cabinet, that controls said conveyance module to convey the respective banknote to said non-recycle cabinet; wherein:

said conveyance state decision module carries out the determination based on a deviation of each banknote in said conveyance module; and said conveyance state decision module changes a reference value, which is used for the determination of the conveyance state based on the deviation, according to width of the banknotes.

2. A bill handling machine for receiving and dispensing banknotes, said bill handing machine comprising:

a recycle cabinet that stores fit banknotes recyclable for subsequent dispensing;

a non-recycle cabinet that stores banknotes unfit for subsequent dispensing;

a conveyance module that conveys banknotes to either one of said recycle cabinet and said non-recycle cabinet;

a conveyance state decision module that determines whether or not conveyance state of each banknote is adequate for storage in said recycle cabinet; and a conveyance control module, responsive to the conveyance state of a respective banknote being inadequate for storage in said recycle cabinet, that controls said conveyance module to convey the respective banknote to said non-recycle cabinet; wherein:

said conveyance state decision module carries out the determination based on an inclination of each banknote relative to a conveying direction in said conveyance module; and said conveyance state decision module changes a reference value, which is used for the determination of the conveyance state based on the inclination, according to width of the banknotes.

3. A bill handling machine in accordance with claim 1, said bill handling machine further comprising:

a recognition module that recognizes a banknote series of each received banknote; and a reference value storage module that stores in advance a mapping of the banknote series to the reference value, wherein said conveyance state decision module changes over the reference value corresponding to the banknote series by referring to said reference value storage module.

4. A bill handling machine in accordance with claim 2, said bill handling machine further comprising:

a recognition module that recognizes a banknote series of each received banknote; and a reference value storage module that stores in advance a mapping of the banknote series to the reference value, wherein said conveyance state decision module changes over the reference value corresponding to the banknote series by referring to said reference value storage module.

5. A bill handling machine for receiving and dispensing banknotes, said bill handing machine comprising:

a recycle cabinet that stores fit banknotes recyclable for subsequent dispensing;

a non-recycle cabinet that stores banknotes unfit for subsequent dispensing a conveyance module that conveys banknotes to either one of said recycle cabinet and said non-recycle cabinet;

a conveyance state decision module that determines whether or not conveyance state of each banknote is adequate for storage in said recycle cabinet;

a conveyance control module, responsive to the conveyance state of a respective banknote being inadequate for storage in said recycle cabinet, that controls said conveyance module to convey the respective banknote to said non-recycle cabinet; and a temporary storage cabinet that temporarily stores received banknotes prior to storage in either one of said recycle cabinet and said non-recycle cabinet; wherein:

said conveyance module comprises a mechanism that carries out a cash counting operation for conveying the received banknotes to said temporary storage cabinet and a cash storage operation for conveying the banknotes from said temporary storage cabinet to either one of said recycle cabinet and said non-recycle cabinet; and said conveyance state decision module adopts a stricter criterion in the cash storage operation than that in the cash counting operation with regard to the determination of the conveyance state adequate for storage of said recycle cabinet.

6. A bill handling machine in accordance with claim 5, wherein an allowable banknote storage width in said recycle cabinet is significantly larger than a width of banknotes to be stored in said recycle cabinet.

7. A bill handling machine that handles banknotes comprising:

a banknote receiving and dispensing module that receives and dispenses banknotes;

an identification module that identifies each banknote received by said banknote receiving and dispensing module;

a temporary storage cabinet that temporarily stores banknotes identified as genuine banknotes by said identification module;

a non-recycle cabinet that stores unrecyclable banknotes; and a control module that compares a reference value regarding a conveyance state of a respective banknote size identified in said identification module, and a conveyance state of a banknote obtained from said identification module, and responsive to the conveyance state of the banknote not fulfilling said reference value, the control module controls retrieval of the respective banknote from said temporary storage cabinet and storing the respective banknote in said non-recycle cabinet.

8. A bill handling machine in accordance with claim 7, wherein said control module stores a reference value table that comprises a respective reference value for every banknote size for determining the adequacy of a conveyance state of each banknote.

9. A bill handling machine in accordance with claim 7, wherein said reference value is determined in advance based on acceptable values of deviation or inclination with respect to the conveyance of a particular banknote size; and wherein said control module stores said reference value.

10. A banknote handling machine in accordance with claim 7, further comprising a reject cabinet that stores unrecyclable banknotes;

wherein, responsive to said identification module determining that a genuine banknote sent from said temporary storage cabinet is unfit for subsequent dispensing, said reject cabinet stores the unfit banknote.

11. A banknote handling machine in accordance with claim 7, wherein said identification module comprises a spot sensor that is disposed in a conveyance path of banknotes to cross over a conveying direction of the banknotes.

12. A bill handling machine that handles banknotes comprising a banknote receiving and dispensing module that receives and dispenses banknotes;

an identification module that identifies each banknote received by said banknote receiving and dispensing module;

a non-recycle cabinet that stores unrecyclable banknotes; and a control module that compares a reference value regarding a conveyance state of a respective banknote size identified in said identification module, and a conveyance state of a banknote obtained from said identification module, and responsive to the conveyance state of the banknote not fulfilling said reference value, the control module controls storing the banknote in said non-recycle cabinet.

13. A bill handling machine in accordance with claim 12, wherein said control module stores a reference value table that comprises a respective reference value or every banknote size for determining the adequacy of a conveyance state of each banknote.

14. A bill handling machine in accordance with claim 12, wherein said reference value is determined in advance based on acceptable values of deviation or inclination with respect to the conveyance of a particular banknote size; and wherein said control module stores said reference value.

15. A banknote handling machine in accordance with claim 12, further comprising a reject cabinet that stores unrecyclable banknotes;

wherein, responsive to said identification module determining that a genuine banknote sent from said temporary storage cabinet is unfit for subsequent dispensing, said reject cabinet stores the unfit banknote.

16. A banknote handling machine in accordance with claim 12, wherein said identification module comprises a spot sensor that is disposed in a conveyance path of banknotes to cross over a conveying direction of the banknotes.

* * * * *